Aug. 11, 1936.  J. H. COHEN  2,050,981
FENDER GUIDE
Filed Oct. 31, 1932
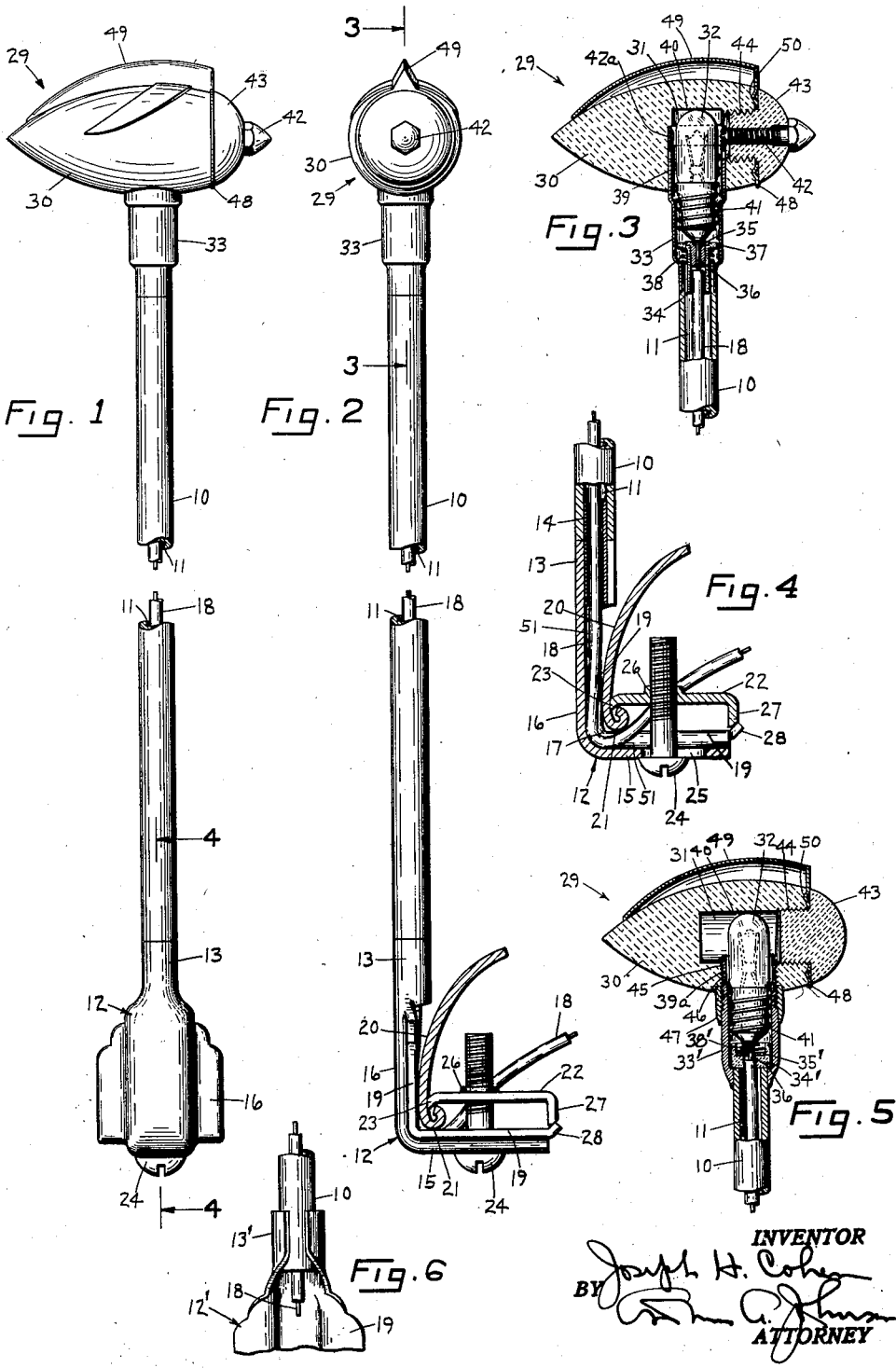
INVENTOR
Joseph H. Cohen
BY
ATTORNEY Patented Aug. 11, 1936

2,050,981

UNITED STATES PATENT OFFICE 2,050,981

FENDER GUIDE

Joseph H. Cohen, Bridgeport, Conn., assignor to Casco Products Corporation, Bridgeport, Conn., a corporation of Connecticut Application October 31, 1932, Serial No. 640,363

12 Claims. (Cl. 240—8.1)

This invention relates to an improved fender guide.

One of the objects of this invention is to provide an improved fender guide whereby the enlargement or target at the top of the stem may be illuminated at night.

A feature of this invention is the simplicity of construction of an illuminated fender guide.

Another feature of this invention is the making of the target of translucent material so that when the source of illumination is energized the entire target will glow.

Another object of this invention is to provide improved means for attaching the fender guide flatwise against the edge of the fender.

According to the present invention, the fender guide is attached to the fender by a clamping member which engages the bead of the fender and which is of such construction that even though a single screw be provided, it firmly grips the bead of the fender and accommodates itself to fenders having beads of different sizes and shapes.

Other features and advantages will hereinafter appear.

In the accompanying drawing which illustrates several forms of the present invention—

Figure 1 is a side elevation of my improved fender guide.

Fig. 2 is a front elevation of my fender guide showing the same attached to the edge of the fender.

Fig. 3 is a longitudinal section taken on the line 3—3 of Fig. 2.

Fig. 4 is also a longitudinal section, but taken on the line 4—4 of Fig. 1.

Fig. 5 is a longitudinal section of a modification of the upper portion of the fender guide shown in the other figures.

Fig. 6 is a longitudinal section through the upper end of the bracket and the lower end of the stem, showing another form of connecting the same.

As shown in the accompanying drawing, the fender guide of my invention comprises a stem 10, preferably in tubular form so as to have a central bore 11. At the lower end of the stem 10 there is provided a bracket 12. This bracket has its upper end formed into a sleeve 13 adapted to embrace the lower end of the stem 10 or an extension thereon. As shown in Fig. 4, the lower end of the stem 10 has sweated to it a tube 14. The tube extends beyond the end of the stem and is sweated to the sleeve 13. As shown in Fig. 6, the end of the stem 10 is directly embraced by the sleeve 13' on the bracket 12'.

The bracket extends downwardly from its point of attachment to the stem 10 and at its lower end is provided with a right angle bend so as to have a horizontal portion 15. This portion 15 and the vertical portion 16 of the bracket is preferably ribbed to strengthen the same and also to provide a clearance passage 17 for a wire 18 referred to below. The raised portions 19 of the bracket engage the surface of the fender 20; the raised portion 19 on the horizontal arm 15 engaging the bead 21 on the end of the fender.

In order to hold the fender guide to fenders having beads of various diameters and shapes, the bracket 12 is provided with a clamping plate 22, the construction of which causes it in its cooperation with the horizontal portion 15 of the bracket to accommodate itself to the particular kind of bead which is contained on the fender upon which the guide is to be mounted.

This plate 22 has at its forward end a downwardly projecting portion or hook 23 adapted, as shown in Figs. 2 and 4, to contact with the material of the fender and engage the bead at approximately the point where the end of the bead portion reengages the fender proper. The plate 22 is drawn toward the arm 15 of the bracket according to the present invention by a single screw 24 which passes through a slotted opening 25 in the lower arm 15 of the bracket and is threaded in a nipple 26 on the plate 22. The rear end of the plate 22 has a bent portion or ledge 27 extending vertically toward the arm 15 but does not engage the latter directly. Instead, it engages upwardly and outwardly extending arms 28 formed preferably but not essentially integral with the horizontal portion 15 of the bracket.

With the parts placed in the position shown in Fig. 4, when the screw 24 is tightened, it draws the plate 22 downwardly so that the hook portion or nose 23 firmly engages the bead 21. At the same time, the ledge 27 at the rear of the plate 22 tends to be forced down and in doing so it tends to move forwardly, that is, toward the fender because of the ledge 27 riding down the inclined surfaces 28. Accordingly, the plate 22, by the simple act of tightening the screw 24, is caused to press against the fender, thereby drawing the parts 19 of the vertical arm 16 against the outside edge of the fender and, at the same time, move downwardly and firmly grip the bead 21 between the hooked portion 23 on the plate 22 and the portions 19 on the horizontal arm 15 of the bracket. If the bead on the fender is larger than that shown, the forward end of the plate 22 would be cocked upwardly, but even so in tightening the screw the plate 22 would be pushed forwardly against the material of the fender. This movement of the plate will continue until the material of the fender is firmly clamped between the vertical portion of the bracket and the nose 28 of the plate, whether the material of the fender is of light or heavy gage.

The inclined surfaces of the parts 27 and 28 respectively, may extend clear across the plate 22. It is, however, preferable to have the parts 28 at opposite sides only of the horizontal arm 15 so that the plate 22 may cant in accommodating itself to the portion of the fender with which it may happen to engage.

By having the screw 24 extend upwardly, the device may be very conveniently clamped to a fender, for there is always sufficient room below the edge of the fender for the manipulation of an upwardly directed screw driver.

The upper end of the stem 10 is provided with an enlarged mass or sight 29 so that the driver of the vehicle may perceive the fender guide out of the corner of his eye without directly gazing at the stem.

According to the present invention, this sight is made of a body 30 which is formed of a light translucent material, preferably colored, and has a cavity or chamber 31 for the reception of an electric lamp 32. The lamp 32 and body 30 being in light-conducting relation, light emanating from the lamp impinges upon the body and causes the entire body to glow. This arrangement is far more preferable and advantageous than one in which only a portion of the body is made of transparent or translucent material, for, when the entire mass glows, its visibility is materially increased.

In the form of the invention shown, the upper end of the stem 10 is provided with a socket or shell 33 for the reception of the lamp 32 which may and preferably is an ordinary lamp of commerce. In the upper end of the stem there is inserted a fibre sleeve 34 carrying a contact 35 soldered to the end of a wire 36 which passes down through the hollow or tubular stem 10. Between the upper edge of the stem 10 and a flange 37 on the fibre collar 34 is a spring 38 which tends to push the sleeve and contact 35 upwardly.

In the form shown in Figs. 1, 2, and 3, the socket 33 has an extension 39 which passes into the cavity 31 in the body 30. After the lamp 32 has been placed in the socket, the body 30 is placed over it and over the socket extension 39 and the body is pressed downwardly forcing the lamp 32 downwardly against the tension of the spring 38. The top of the lamp engages the roof 40 of the chamber 31. In being pressed downwardly, the lamp cants on its central contact which engages the contact 35 and, accordingly, the shell 41 of the lamp is brought into electrical engagement with the socket 33. This socket 33, being in metallic connection with the stem 10 and the bracket 12, conducts current from the grounded side of the usual battery to the shell 41 of the lamp.

In the form shown in Figs. 1, 2, and 3, the body 30 is held in position on the socket extension 39 by means of a set screw 42 engaging an aperture in the shell 39.

According to the present invention, the body 30 may be made of translucent material of two colors, and, as shown, the major portion of the body is made of one color while a minor portion 43 is made of another color. These portions are screw-threaded together at 44. The portion 43 is intended to be the front of the body and to face forwardly when the fender guide is applied to a vehicle. It is usually made of purple or green material, whereas the remaining portion of the body is usually made of red material.

The sight 29 accordingly has a front and back, and, were no other provision made, it would be necesary to supply to the public different fender guides for the right and left-hand fenders.

To avoid the necessity of providing two different types of fender guides, the present invention provides means whereby the sight 29 may be adjusted by the user, or the mechanic applying the fender guide to the vehicle, so that the front part 43 will always face forwardly.

For this purpose, the sight 29 is rotatably mounted on the socket extension 39 and, at diametrically opposite places on the socket, there are provided apertures 42a for the set screw 42. With the device as shown in Fig. 3, to reverse the sight 29, it is merely necessary to withdraw the set screw 42 slightly and then rotate the sight 29 180° and then tighten the set screw so that the point thereof will enter the opposite aperture 42a.

In Fig. 5, a modification of this idea is disclosed. Again, the body 30' of the sight has an aperture to receive an extension 39a on a socket 33', but in this case the extension is provided with a screw thread 45. The aperture in the body is also provided with screw threads 46 so that the body 30' is screw-threaded to the socket 33' and may be adjusted to any desired angular position with relation to the stem that may be wanted. For the purpose of securing the body 30' in the adjusted or desired position, the threaded portion of the socket is provided with a lock nut 47. This form of the invention has considerable advantage over that shown in Fig. 3, for it avoids the necessity of having any metal parts within the cavity 31 which would tend to shield the light emanating from the lamp 32. It also has the advantage of not requiring the use of the set screw 42 and allows the neck of the body part 43 to be in direct and substantial light-conducting relation with the lamp 32.

The electrical contact means for the lamp shown in Fig. 5 is somewhat different from that shown in Fig. 3. Instead of having the sleeve 37, which is pressed upwardly by the spring 38, in the form of the invention shown in Fig. 3, there is a fibre sleeve 34' containing a disk 35' to the end of which the feed wire is soldered. Resting on the disk 35' there is a spring 38' which presses upwardly against the central contact on the lamp and transmits current thereto.

Of course, it is within the scope of this invention to have the portion 43 made of opaque or non-light transmitting material if desired, for this part faces forwardly, and it is for the benefit of the driver of the vehicle that the fender guide is provided.

When the parts 30 and 43 are, as is preferred, made of translucent material, such, for instance, as phenol condensation product, it is preferable to block out the transmission of light from one part of the body to the other as much as possible and thereby prevent blending of the light emanating from the glowing body. For this purpose, the present invention provides a washer 48 between the parts 30 and 43. In the form shown, this washer is extended upwardly and carries a portion 49 serving as an ornament. The position of the washer and of the ornament is gaged by embossings 50 on the washer entering suitable apertures in the forward end of the body 30.

The material of which the parts 30 and 43 are formed may be clear or cloudy. If formed of the latter, a very striking and attention-impelling appearance is produced, for the light from the lamp will be transmitted efficiently through the less cloudy parts and will impinge upon the cloudy parts, causing them to glow brilliantly.

The wire 36 is led down through the tubular stem 10 and at the bracket passes through a channel 51 in the vertical and horizontal portions of the bracket 12. It passes out from under the bead of the fender between the plate 22 and the horizontal member 19 of the bracket and its end may be attached at any convenient point to the current supply system of the vehicle.

Variations and modifications may be made within the scope of this invention and portions of the improvements may be used without others.

Having thus described the invention, what is claimed as new and for which it is desired to obtain Letters-Patent, is:—

1. In a fender guide, a stem; means secured to the lower end of the stem and projecting laterally from one side thereof for securing the latter flatwise to the edge of either a right-hand or left-hand fender; a sight at the upper end of the stem having front and back portions of different forms, the front portion being intended to face forwardly; means rotatably supporting said sight so that said front portion may be adjusted to face forwardly whether the fender guide is attached to either the right or left fender; and means for securing the sight in either adjusted position.

2. In a fender guide, a stem; means secured to the lower end of the stem and projecting laterally from one side thereof for securing the latter flatwise to the edge of either a right-hand or left-hand fender; a sight at the upper end of the stem having front and back portions of different forms, the front portion being intended to face forwardly; means rotatably supporting said sight so that said front portion may be adjusted to face forwardly whether the fender guide is attached to either the right or left fender; and means carried by the stem for clamping said sight in either adjusted position.

3. In a fender guide, a stem; means secured to the lower end of the stem and projecting laterally from one side thereof for securing the latter flatwise to the edge of either a right-hand or left-hand fender; a sight at the upper end of the stem having front and back portions of different forms, the front portion being intended to face forwardly; means rotatably supporting said sight so that said front portion may be adjusted to face forwardly whether the fender guide is attached to either the right or left fender; and means carried by the said front portion of the sight for securing said sight in either adjusted position of the stem.

4. In a fender guide, a stem; means for securing the stem in position on a motor vehicle; a sight at the upper end of the stem; a source of illumination mounted within the sight, the body of said sight being made of translucent material and being adapted to glow all over when light originating in said source of illumination impinges on such material, said sight being formed of materials of different colors each in light-conducting relation with said source of illumination, said materials themselves being juxtaposed; and a thin opaque plate interposed between a substantial portion of the juxtaposed materials of different colors to prevent blending of colors in light emanating from said material.

5. In a fender guide, a stem; means for securing the stem to a fender; a socket at the upper end of the stem; current-conducting means in the socket; an electric lamp freely slidable in the socket; a sight member applied over the socket, said sight member having a body made of translucent material so as to glow when light from said lamp impinges on such material and having a chamber therein receiving and approximately fitting said lamp; and spring means in the socket adapted to hold the lamp in firm contact with the roof of the chamber in said body of the sight member.

6. In a fender guide, a stem; means for securing the stem to a fender; a socket at the upper end of the stem; current-conducting means in the socket; an electric lamp in the socket; a sight member applied over the socket, said sight member having a body made of translucent material so as to glow when light from said lamp impinges on such material; spring means in the socket adapted to hold the lamp in firm contact with the roof of a cavity in said body of the sight member; and cooperating screw threads on the body and the socket respectively for holding the body on the socket.

7. In a fender guide, a stem; means for securing the stem to a fender; a socket at the upper end of the stem; current-conducting means in the socket; an electric lamp in the socket; a sight member applied over the socket, said sight member having a body made of translucent material so as to glow when light from said lamp impinges on such material; spring means in the socket adapted to hold the lamp in firm contact with the roof of a cavity in said body of the sight member; and a set screw for securing the latter to the socket.

8. In a fender guide, a stem; means for securing the stem in position on a motor vehicle; a sight at the upper end of the stem; and a source of illumination mounted within the sight, the body of said sight being made of translucent material and being adapted to glow all over when light originating in said source of illumination impinges on such material, the body of said sight being formed of materials of different colors screw-threaded together and each in light-conducting relation to the source of illumination.

9. In a fender guide, a stem; means for securing the stem to a fender; a sleeve at the upper end of the stem; a lamp carried by said sleeve; and a sight applied over said lamp and sleeve, said sight having a body made of translucent material provided with a chamber therein to receive the lamp and sleeve, said chamber having an entrance opening fitting the external dimension of the sleeve and said lamp having a girth less than the diameter of the entrance opening so that the sleeve and lamp carried thereby may be inserted in said entrance opening as a unit.

10. In a fender guide, a stem; means for securing the stem to a fender; an externally threaded sleeve at the upper end of the stem; a lamp carried by said sleeve; and a sight applied over said lamp and sleeve, said sight having a body made of translucent material provided with a chamber therein to receive the lamp and socket, said chamber having a threaded entrance opening fitting the external dimension of the sleeve and said lamp having a girth less than the diameter of the threaded entrance opening so that the sleeve and lamp carried thereby may be screwed into said threaded entrance opening as a unit.

11. In a fender guide, a stem; means for securing the stem to a fender; a socket at the upper end of the stem; current-conducting means in the socket; an electric lamp in the socket; and a sight member applied over the socket, said sight member having a body made of translucent material so as to glow when light from said lamp impinges on such material and being solid except for a chamber therein receiving and approximately fitting the lamp and lamp socket, and said chamber receiving and forming a bearing on the socket at the upper end of the stem.

12. In a fender guide, a stem; means for securing the stem to a fender; a socket at the upper end of the stem; current-conducting means in the socket; an electric lamp freely slidable in the socket; a sight member applied over the socket, said sight member having a body made of translucent material so as to glow when light from said lamp impinges on such material, and having a chamber therein receiving and approximately fitting said lamp; and means placed under tension when said sight member is applied over said socket to hold said lamp in said chamber and socket against casual movement.

JOSEPH H. COHEN.